Patented Mar. 18, 1952

2,589,919

UNITED STATES PATENT OFFICE 2,589,919

METHOD OF PRODUCING A BUTADIENE-ACRYLONITRILE COPOLYMER LATEX OF HIGH SOLIDS CONTENT

Erving Arundale, Westfield, N. J., and Frances Bascom, Staten Island, N. Y., assignors to Standard Oil Development Company, a corporation of Delaware No Drawing. Application December 19, 1947, Serial No. 792,854

16 Claims. (Cl. 260—82.3)

The present invention relates to the manufacture of latex from diolefin-acrylonitrile copolymers and, more specifically, to a concentrated latex of high rubber solids content. The invention will be understood from the following description.

In the rubber art there have been methods for producing concentrated or high solids content latex from natural rubber latex and also such high solids latices have been produced from some of the synthetic rubbers. These latices are of particular value in producing sponge rubber, dipped goods, and coated fibers such as paper and cloth. It has been particularly desired to produce such a latex from diolefin-acrylonitrile rubbers of the type which are highly resistant to attack by oil, but considerable difficulties have arisen in the production of such materials. One of the methods proposed has been to produce an ordinary latex of low solids content and to cream such a latex to produce the high concentration product. Such processes have been developed but they have great difficulties in respect to control of the creaming process and many of the latices produced in this way have not been of the best quality. Another method is now proposed by which the high concentration latex is produced directly in the polymerization process by greatly reducing the amount of water originally added, but this process has also met with difficulty. In the first place, it has been found difficult to reach commercial conversions of over 70% in short periods of time and, on the other hand, due to the fact that the polymerization itself is carried out at a rather low temperature, the latex becomes extremely viscous, making temperature regulation difficult and control of the process extremely difficult in consequence.

Some success has apparently been gained in production of high solids content latex of butadiene-styrene copolymers, but it is recognized that this is a problem of considerably less difficulty than is presented with the nitrile rubbers because of inherent differences in the processes and the products. Viscosity of the emulsion is a much greater problem with nitrile rubbers because of the fact that the temperature of polymerization for these polymers is considerably less than for the styrene rubbers and little or no difficulty with gelation occurs with styrene rubbers. The styrene monomer is much less water-soluble than the nitrile, and this seems to have a very favorable effect on the particle size and stability of the emulsion produced. Instability of the nitrile emulsion is also aggravated by the fact that the pH of the emulsion is always below about 9.5, whereas, in the case of the styrene process, it is above 10. It has been our experience that recipes published for the direct polymerization of butadiene-styrene rubbers to high rubber content latices are unsatisfactory for application to nitrile rubbers.

It has now been found that high quality diolefin-nitrile copolymers may be produced in the form of concentrated latices directly in the polymerization process by closely controlling the polymerization procedure within narrow limits and by the combination of several balancing factors. These factors are briefly as follows: (1) Narrow limiting ratios of the comonomers; (2) certain specific emulsifying agents of a type capable of inducing polymerization must be used within certain limiting concentrations; (3) certain electrolytes which have the power of increasing particle size must be used in connection with dispersing agents which, in contrast to the emulsifier mentioned above, do not incite polymerization but stabilize the rubber particles which have been increased in size due to the action of the electrolyte.

It will, of course, be understood that the polymerization is effected in the presence of water and of known catalysts, preferably alkali persulfates, such as potassium persulfate, said catalysts being used in the range of 0.2 to 0.3 part by weight per 100 parts of the comonomers. In the same manner it is desirable to employ alkyl mercaptans of 10 to 16 carbon atoms as known in the present art as modifiers of the reaction to prevent too high a degree of polymerization, these modifiers being used in amounts from 0.4 to 1.0 part/100 parts of the comonomers. Furthermore, the temperature is maintained below 50° C.—that is, lower than ordinary at present, and usually between 30 and 45° C., and the time will be of the order of 10 to 45 hours, which is sufficient in most cases to produce a conversion of at least 70% and preferably in the range of 85 to 95%. It will be understood, of course, that this polymerization takes place while the comonomers are emulsified in water and the emulsion must be agitated and the heat of the reaction withdrawn by suitable cooling means. The agitation must not be too vigorous because coagulation can be brought about in this manner and it has been found that preferably the stirrers have a peripheral speed of 600 to 900 feet per minute.

The combination of the various factors mentioned in the paragraph just preceding are desirable adjuncts to the process and useful to obtain the best results, but they are believed to be largely conventional and are not absolutely essential to produce an operative process. Furthermore they do not differ widely from the ordinary conditions used in the preparation of dilute latices produced at the present time. For these reasons it is believed that these steps are not to be considered essential elements of the present invention.

Returning to the essential factors of the present invention, it will be understood that the comonomers are admixed in proportion of 65 to 85 parts by weight of the conjugated diolefin, preferably butadiene, and 35 to 15 parts by weight of acrylonitrile. The amount of water is from say 60 to 75 parts by weight so that making allowances for some evaporation during subsequent stripping of the unconverted monomers, the product will contain above 45% and preferably above 50% of rubber solids in the form of a concentrated but fluid latex.

The emulsifier, as stated before, is an important feature of the present invention and is limited both in kind and amount, particularly at the initiation of the reaction. The preferred emulsifier is the potassium soap of one of the fatty acids within the range from 10 to 18 carbon atoms such as, for example, potassium oleate, potassium laurate, but cheaper soaps such as the potassium rosin acid soaps may be used and mixtures of the types mentioned can also be employed. It is preferred to use soaps which are not fully neutralized, that is to say, which are neutralized to the extent of say 85 to 95% of the theory (potassium hydroxide) giving a pH below about 9.5, and these are markedly superior to the ordinary soda soaps generally used at present and to the fatty acid soaps either above the range of 18 or below 10 carbon atoms. Another type of emulsifier which is useful and can be employed for the present process is an alkali alkyl sulfate. In this case the alkali may be a sodium, as well as potassium and the lauryl sulfates are good examples, although the alkyl group may be from decyl to hexadecyl. These various emulsifying agents must be used for best results in quantities which according to the present art would be considered too small; for example, from 0.3 to 1.0 part per hundred parts by weight of the mixed comonomers, especially at the beginning of the reaction, but the amounts may be increased later with some advantage of increased stability after the conversion has proceeded to 15% or 20%. If more than the amount mentioned above is used, at the start there is considerable tendency toward gelling and excessive viscosity during the run which make control very difficult. The addition of soap after partial conversion, as mentioned before, has the advantage that it will assist in carrying the conversion through to a higher degree than in its absence, and will reduce flock formation.

The third important factor in the present invention is the conjoint use of agents on one hand, to increase particle size, and on the other hand to prevent flocculation or coagulation. For the first of these functions the agent employed is an electrolyte or brine and it is used in the proportion of about 0.2 to 0.75 part by weight per hundred parts of the comonomers. The preferred salts are the sodium and ammonium salts and they should be carefully chosen because it is sometimes found that certain specific salts are not so desirable as others for example, in effecting a partial poisoning of the polymerization or destroying the emulsifying agent. The preferred salts, which have been found most satisfactory, are the chlorides, sulfates, bisulfites, acetates, dibasic phosphates and pyrophosphates. If the electrolyte is present in higher amounts actual coagulation will be encountered and the amount of the electrolyte and the disperser mentioned below must be proportioned in conjunction so as to obtain the best result. The preferred disperser is the sodium salt of a formaldehyde condensed beta naphthalene sulfonic acid, but others may be used such as the potassium salts of the fatty acids of 8 to 9 carbon atoms. These latter products must be carefully distinguished from the fatty acid soap emulsifiers mentioned above and they cannot be used interchangeably for both of these purposes. It has been found that the soaps of 8 and 9 carbon atoms while acting as excellent dispersers will not initiate polymerization. The initial disperser concentration should be from about 1.0 to 2.0 parts per hundred parts by weight of the comonomers, at least until 15 or 20% conversion is obtained, and thereafter additional disperser can be added with advantage. It should be repeated that the electrolyte and the disperser are used in conjunction and the actual amounts should be carefully adjusted. Small differences between the different electrolytes will be found within the ranges of the amounts given and they should be adjusted within the range given to obtain the desired degree of conversion, stability and particle size.

Now returning to the process, the water, emulsifier, disperser, electrolyte, diolefin and acrylonitrile are added to the autoclave and the agitator started. The catalyst is then introduced, being careful not to add too much—which has a tendency toward increasing gelation. The charge is then heated to the desired temperature. It is preferred to add the mercaptan in stages, for example one-half of the total at the start, one-quarter after say 10 to 25% of the conversion has been obtained, and the remaining quarter after 45 to 50% of the conversion has been effected. After the conversion reaches 70 to 95%, further reaction is inhibited by addition of hydroquinone or neutralized hydroxyl amine salts, according to the usual procedure, and it is also usual to add an oxidation inhibitor for the rubber at this point, such as phenyl beta naphthylamine or ditertiary butyl paracresol or the like. The temperature is then raised in order to flash off unreacted butadiene, and steam or vacuum is employed to vaporize and recover the acrylonitrile. The latex is then obtained in a highly concentrated form, stable and ready for use.

The high solid latex made by the present process, if proper adjustments within the ranges defined are employed, is of excellent quality, not too viscous for use in the processes in which it has the most advantages, for example in coating fibers, paper, cloth and the like, the manufacture of dipped goods and sponge rubber. The concentration of rubber solids is usually between 45 and 60%.

The following examples will further illustrate the present invention.

*Example 1*

A series of runs was made under the following general conditions:

| | |
|---|---|
| Water | 75 parts by weight |
| Butadiene | 74 parts by weight |
| Acrylonitrile | 26 parts by weight |
| N-hexadecyl mercaptan | 0.5 part by weight |
| Potassium persulfate | 0.25 part by weight |

Emulsifier—potassium oleate_ Amount varied
Electrolyte — sodium pyrophosphate _____ Amount varied
Disperser—formaldehyde-condensed B naphthalene-sulfonic acids-sodium salt_ 1.5 parts by weight
Polymerization temperature _ 35° C.
Time of operation _____ 44 hours.

| Run | A | B | C | D | E |
|---|---|---|---|---|---|
| Parts/100 parts monomers | | | | | |
| Disperser | | | 1.5 | 1.5 | 1.5 |
| Oleic acid [1] | 1.5 | 1.5 | 0.75 | 0.75 | 1.5 |
| $Na_4P_2O_7.10H_2O$ | 0.5 | | | 0.5 | |
| Percent conversion | 93 | 91 | 83 | 92 | 92 |
| Viscosity | Would not flow | Thick | Thick | [2] Fluid | Would not flow |

[1] Oleic acid neutralized 90 percent of theory with KOH.
[2] After flashing the latex contained 55.4 percent total solids.

The above data indicates that high conversion latices may be prepared in the presence of only 75 parts of water. When the amount of oleic acid in the emulsifier is up to 1.5, the products are very viscous and probably too thick for best operation. These are represented in runs A and B. Using the same conditions in run D and employing both the disperser and the electrolyte, an excellent fluid latex was produced at a 92% conversion. Runs C and E showed substantially the same conditions but without the electrolyte and in both cases the latices produced were very thick or would not flow.

Example 2

Nine runs were made under the same general conditions as Example 1, but with certain variations in the amount of the emulsifier, type and amount of electrolyte and amount of disperser. The data on these runs are given in the following table:

| Run | A | B | C | D | E | F | G | H | I |
|---|---|---|---|---|---|---|---|---|---|
| Parts/100 parts monomers | | | | | | | | | |
| Oleic acid [1] | 0.75 | 0.375 | 0.75 | 0.375 | 0.75 | 0.75 | 0.75 | 0.75 | 0.75 |
| Disperser | 1.5 | 1.5 | 1.5 | 2.0 | 1.5 | 1.5 | 1.5 | 1.5 | 1.5 |
| $Na_4P_2O_7.10H_2O$ | 0.5 | 0.5 | 1.0 | 0.5 | | | | | |
| NaCl | | | | | 0.5 | | | | |
| $Na_2HPO_4$ | | | | | | 0.5 | | | |
| $NH_4Cl$ | | | | | | | 0.5 | 0.3 | |
| $NH_4$ acetate | | | | | | | | | 0.5 |
| Per Cent Conversion | 91.5 | 93 | 86 | 91.5 | 72 | 83 | 62 | 83 | 81.5 |
| Viscosity rating [2] | 7 | 6 | 4 | 5 | 2 | 3 | 1 | <1 | <1 |

[1] Oleic acid neutralized 90 per cent of theory with KOH.
[2] Lowest number=least viscous, highest number=most viscous of series.

The emulsifier in each case was an oleic acid soap in which 90% of the oleic acid had been neutralized with KOH. The viscosity rating figures given at the bottom of the table were estimations of relative viscosity made by pouring samples containing residual monomers from a bottle. All of the emulsions made were satisfactory and the series of tests is merely to show that the viscosity of the emulsion may be changed by varying the amounts of the electrolyte and the amount of the disperser, which was the same as employed in Example 1.

Example 3

The runs listed below were made with the following general recipe:

Water _____parts by weight__ 65
Emulsifier—oleic acid (neutralized 90% with KOH)_____do____ 0.375
Disperser—caprylic acid (neutralized 90% with KOH)_____do____ 1.5
Potassium persulfate _____parts__ 0.25
Mixed alkyl mercaptans [1]_____parts__ 0.4
Butadiene _____do____ 74
Acrylonitrile _____do____ 26
Electrolyte _____do____ 0.35
Polymerization conditions—44 hours at 35° C.

[1] Prepared from commercial lorol alcohol.

Data for the runs are given in the table below and show that in run A, without any electrolyte, the latex was too viscous although a high conversion was obtained. With all of the remaining electrolytes, the viscosity was satisfactory. In some instances conversion was not as great as desired. Run G should be noted in which monobasic sodium phosphate was used as the electrolyte. Apparently this material is too acid for good yield since it attacks the emulsifier.

| Run | Electrolyte | Per cent Conversion | Observed Viscosity |
|---|---|---|---|
| A | None | 94.8 | Latex would not flow. |
| B | Sodium chloride | 82.2 | Fluid. |
| C | Sodium pyrophosphate | 94.3 | Do. |
| D | Dibasic sodium phosphate | 87.8 | Do. |
| E | Sodium bisulfite | 90.8 | Do. |
| F | Ammonium chloride | 41.2 | Do. |
| G | Monobasic sodium phosphate | 20.9 | Do. |

Example 4

The following charge was used in the runs given below and in the second table data from runs using various fatty acids of from 8 to 18 carbon atoms are reported together with the conversions obtained:

Water _____parts by weight__ 75
Butadiene _____parts__ 74
Acrylonitrile _____do____ 26
Fatty acid _____parts (type varied)__ 1.5
Extent of fatty acid neutralized with KOH _____percent__ 90
Potassium persulfate _____parts__ 0.25
Mixed alkyl mercaptans _____parts__ 0.4
Polymerization conditions 24 hours at 25° C.

| Run | Fatty Acid | No. of Carbon Atoms | Per cent Conversion |
|---|---|---|---|
| A | Caprylic | 8 | [1] 11.7 |
| B | Pelargonic | 9 | [1] 20.9 |
| C | Capric | 10 | [2] 79.0 |
| D | Undecylenic | 11 | [2] 86.1 |
| E | Lauric | 12 | [2] 85.8 |
| F | Oleic | 18 | [2] 92.1 |

[1] Very fluid latex of large particle size.
[2] Very viscous latex of small particle size.

These data are given to show the distinct difference between the acids of 8 and 9 carbon atoms on the one hand and those of 10 to 18 on the other. This latter group all had relatively high conversions and defines the group of acids whose soaps are suitable as emulsifiers since they apparently initiate the polymerization, whereas the fatty acids of 8 and 9 gave only very low conversions and their soaps are therefore unsuitable as emulsifiers, since they do not initiate the polymerization. On the other hand it also demonstrates that the acids of 8 and 9 carbon atoms can be used as dispersers.

Reference is now made to Example 3 above, which shows a run in which potassium oleate was used as the emulsifier in conjunction with potassium caprylate as the disperser, which were shown to be a satisfactory combination.

Example 5

The following example was made in a 3-gallon laboratory reactor with a stirrer having a peripheral speed of 630 feet per minute. The disperser was the sodium salt of the formaldehyde condensed beta naphthalene sulfonic acid. The proportions of reactants and conditions are given in the table. It should be noted that the total polymerization time was only 16.25 hours, 74% conversion was obtained, and after stripping the latex had 57.8% solids content.

Charge (parts by weight/100 parts monomer):

| | |
|---|---|
| Water | 65 parts |
| Butadiene | 74 |
| Acrylonitrile | 26 |
| Oleic acid | 0.375 |
| KOH (per cent neutralization of oleic acid) | 0.67—(90%) |
| Disperser | 1.5 |
| Mercaptan (added ½ initially, ¼ at 25% conv., ¼ at 50% conversion) | 0.48 |
| Electrolyte (sodium pyrophosphate) | 0.5 |
| Catalyst (potassium persulfate) | 0.25 |

Polymerization conditions:

| | |
|---|---|
| Temperature — hours | 35° C. (3 hr.); 38° C. (remainder) |
| Per cent conversion | 74.1 |
| Total time | 16.25 hours |

Stabilization before dump:

| | |
|---|---|
| Oleic acid (100% neutralization with KOH) | 0.625 |
| KOH (excess) | 0.146 |
| Water | 3.0 |

Shortstop:

| | |
|---|---|
| Agent (parts/100 parts monomer) | 0.15 NH2OH.HCl—neut. with KOH |
| Water (parts/100 parts monomer) | 1.04 |

Total solids in latex:

| | |
|---|---|
| After shortstop and before stripping | 47.5% |
| After stripping | 57.8% |

This run was excellent throughout, it was accomplished without any difficulty and the temperature control was excellent because the latex never tended to gel or become too thick.

In several additional runs slight variations of the above control run were made in order to test slight changes of various sorts. Without detailing them in extenso, it may be said that in one of these runs its was found that two-tenths part of sodium chloride was equally effective as the pyrophosphate used in the control run from the point of view of conversion, viscosity, particle size and quality. Also, it was shown that increasing the amount of disperser to two parts or more began to be undesirable and caused considerable thickening of the latex with difficulties in temperature control. Use of .25 part of oleic acid, neutralized with KOH as the emulsifier, caused an inversion of phase which was not desired, but this was noted quickly and by the addition of 0.125 part of additional oleic acid and KOH, the emulsion was inverted and the run continued to a successful conclusion.

In further runs the electrolyte, which was sodium pyrophosphate, was increased to .75% and difficulties began to be encountered with excessive viscosity. Where sodium stearate was used as the emulsifier in place of potassium oleate, the emulsion gelled badly and the temperature could not be controlled, but potassium laurate was equally as good as potassium oleate. In one run the soap emulsifier was eliminated and the amount of the disperser was increased to 5% to determine whether it could serve both functions. This run again was unsuccessful, since the conversion was very low.

Surveying the result of all of these runs on the large reactor, the following limits are believed to be fully justified: emulsifier—potassium soaps of fatty acids containing 10 to 18 carbon atoms, 0.3 to 1.0 part per hundred parts of monomer; disperser 1.0 to 2.0 parts; electrolyte 0.2 to 0.75 part/100 of monomer.

It will be understood that this conclusion is for the particular emulsifier and the particular dispersers indicated.

Example 6

In a 50-gallon reactor the following run was made:

| | |
|---|---|
| Butadiene | 74 parts |
| Acrylonitrile | 26 parts |
| Oleic acid | 0.685 |
| KOH (per cent neutralization of acid) | 90% |
| Disperser [1] | 1.5 |
| Lorol mercaptan (added ½ initially, ¼ at pour 4 and ¼ at 45% conversion) | 0.5 |
| Potassium persulfate | 0.25 |
| Sodium pyrophosphate .10H2O | 0.50 |
| Water | 65 |
| Temperature | 35° C. to 8% conv.; 46° C. to 70% conv. |
| Conversion | 70% |
| Reaction time | 21.5 hours |
| Shortstop — Hydroxylamine HCl (neutralized with KOH) | 0.2 part |

Evaluation:
Latex—

| | |
|---|---|
| Total solids | 52.5% |
| pH | 9.4 |

Polymer—

| | |
|---|---|
| Williams plasticity - recovery | 185-35 |
| Mooney—2 min. at 212° F | 176 |

[1] The disperser was sodium salt of formaldehyde condensed beta naphthalene sulfonate.

In this case the peripheral speed of the agitator was 850 feet per minute and the preferred amount of soap was slightly increased over the preferred amount in the three-gallon reactor due to the higher peripheral speed which required slightly greater stability.

Example 7

The following run was made in a 50-gallon reactor:

| | |
|---|---|
| Butadiene _parts by weight_ | 74 |
| Acrylonitrile _do_ | 26 |
| Oleic acid _do_ | 0.9 |
| KOH—neutralized _per cent_ | 90 |
| Disperser _parts by weight_ | 1.5 |
| Lorol mercaptan _do_ | .55 |
| Potassium persulfate catalyst _do_ | .25 |
| Sodium pyrophosphate .10H$_2$O _do_ | .50 |
| Water _do_ | 65 |

The disperser in this case was the same as employed in the prior example.

The reaction started at 35° C. and proceeded for three hours at that temperature; then it was raised to 46° C. for 9 hours and thereafter continued at about 50° C. for 12.5 hours. The total time was 24.5 hours and the conversion was 77%.

At about 18% conversion a small amount of flock was noticed to have developed and .35 part/100 of oleic acid was added, it being 100% neutralized with KOH (.08 part/100) with 3 parts of water. This appeared to prevent any further formation of flock.

At about 50% conversion it was observed that the latex was becoming too viscous, and 1.0 part/100 of additional disperser was added along with 2 parts water. This was found to reduce the viscosity. At the end of the run, 77% conversion, .2 part of KOH neutralized hydroxyl ammonium chloride was added to stop further reaction, and the latex was withdrawn. It was filtered to remove the flock and was found to contain 50.3% of rubber solids, and had a pH of 9.

In this run the original emulsifier was present in a somewhat higher proportion than had usually been the case, and a small amount of flock was encountered. Although the run was successful and the product after filtration was satisfactory, there was the additional filtration step, and it is believed that this could be completely avoided if the emulsifier, disperser and electrolyte were present in the most advantageous proportion. One way to avoid this formation of flock is to add the emulsifier, disperser and electrolyte at intervals throughout the conversion instead of all at once and little difficulty will be found in devising a suitable schedule for the addition. If this had been done in the present run, the small amount of flock produced could thus have been easily avoided.

We claim:

1. An improved process for producing latex of high solids content directly by emulsion polymerization of a conjugated diolefin and acrylonitrile which comprises admixing 65 to 85 parts of the diolefin with 35 to 15 parts of acrylonitrile and 60 to 75 parts of water, emulsifying these ingredients with 0.3 to 1.0 part of an emulsifier capable of inducing polymerization and selected from the group consisting of potassium soaps of fatty acids having 10 to 18 carbon atoms per molecule and alkali alkyl sulfates having 10 to 16 carbon atoms per alkyl group, effecting the polymerization at a temperature below 50° C. while agitating the resulting emulsion at a peripheral agitation speed between 600 and 900 feet per minute in the conjoint presence of 0.2 to 0.3 part of an alkali persulfate catalyst, of 0.2 to 0.75 part of an electrolyte selected from the group consisting of sodium and ammonium salts of hydrochloric, phosphoric, sulfuric, sulfurous, acetic, and pyrophosphoric acids to cause particle size growth and 1.0 to 2.0 parts of a disperser selected from the group consisting of the fixed alkali salts of a formaldehyde condensed beta naphthylene sulfonic acid and a fixed alkali salt of a fatty acid having not less than 8 and not more than 9 carbon atoms to prevent coagulation, stopping polymerization after at least 70% conversion and stripping off the unconverted monomers.

2. A process according to claim 1 in which the emulsifier is a potassium soap of the fatty acids containing 10 to 18 carbon atoms.

3. Process according to claim 2 in which the potassium soaps employed as the emulsifier are used in proportion of 0.3 to 1.0 part per 100 parts of total monomers.

4. Process according to claim 2 in which the emulsifier is oleic acid neutralized to about 85 to 95% of the theoretical with potassium hydroxide.

5. Process according to claim 2 in which the emulsifier is potassium laurate.

6. Process according to claim 1 in which the emulsifier is the potassium soap of a rosin acid.

7. Process according to claim 1 in which the emulsifier is a sodium lauryl sulfate.

8. In a process for manufacturing high solids content latex direct emulsion polymerization of butadiene and acrylonitrile, the steps of emulsifying 65 to 85 parts of butadiene and 35 to 15 parts of acrylonitrile with 60 to 75 parts of water in the presence of 0.3 to 1.0 part of potassium laurate neutralized with potassium hydroxide to the extent of 85 to 95% of theory as the emulsifying agent at a temperature between 35 and 45° C. while in the conjoint presence of 0.2 to 0.3 part of an alkali persulfate catalyst, of 0.2 to 0.75 parts of sodium chloride and 1.0 to 2.0 parts of the sodium salt of formaldehyde condensed beta naphthylene sulfonic acid, stopping polymerization after conversion of at least 70% and stripping off uncondensed monomers.

9. In a process for manufacturing high solids content latex direct emulsion polymerization of butadiene and acrylonitrile, the steps of emulsifying 65 to 85 parts of butadiene and 35 to 15 parts of acrylonitrile with 60 to 75 parts of water in the presence of 0.3 to 1.0 part of potassium laurate neutralized with potassium hydroxide to the extent of 85 to 95% of theory as the emulsifying agent at a temperature between 35 and 45° C. while in the conjoint presence of 0.2 to 0.3 part of potassium persulfate catalyst, of 0.2 to 0.75 part of sodium pyrophosphate and 1.0 to 2.0 parts of the sodium salt of formaldehyde condensed beta naphthylene sulfonic acid, stopping polymerization after conversion of at least 70% and stripping off uncondensed monomers.

10. In a process for manufacturing high solids content latex direct emulsion polymerization of butadiene and acrylonitrile, the steps of emulsifying 65 to 85 parts of butadiene and 35 to 15 parts of acrylonitrile with 60 to 75 parts of water in the presence of 0.3 to 1.0 part of potassium laurate as the emulsifying agent at a temperature between 35 and 45° C. while in the conjoint presence of 0.2 to 0.3 part of potassium persulfate, 0.2 to 0.75 part of sodium chloride and 1.0 to 2.0 parts of potassium caprylate, stopping polymerization after conversion of at least 70% and stripping off uncondensed monomers.

11. In a process for manufacturing high solids content latex direct emulsion polymerization of butadiene and acrylonitrile, the steps of emulsifying 65 to 85 parts of butadiene and 35 to 15 parts of acrylonitrile with 60 to 75 parts of water in the presence of 0.3 to 1.0 part of potassium laurate as the emplsifying agent at a temperature between 35 and 45° C. while in the conjoint presence of 0.2 to 0.3 part of an alkali persulfate catalyst, 0.2 to 0.75 part of sodium pyrophosphate and 1.0 to 2.0 parts of potassium caprylate, stopping polymerization after conversion of at least 70% and stripping off uncondensed monomers.

12. Process according to claim 1 in which the disperser is the fixed alkali salt of a formaldehyde condensed beta naphthalene sulfonic acid.

13. Process according to claim 1 in which the disperser is a fixed alkali salt of a fatty acid, of 8 to 9 carbon atoms.

14. Process according to claim 1 in which the disperser is a potassium salt of a fatty acid of 8 to 9 carbon atoms.

15. In a process according to claim 1, the step of adding additional emulsifier after the conversion has proceeded to at least 15%.

16. In a process for manufacturing high solids content latex by direct emulsion polymerization of butadiene and acrylonitrile, the steps of emulsifying 65 to 85 parts of butadiene and 35 to 15 parts of acrylonitrile with 60 to 75 parts of water, using a potassium salt of a fatty acid of 10 to 18 carbon atoms neutralized with alkali to the extent of 85 to 95% of theory in proportion of 0.3 to 1.0 part as the emulsifying agent, conducting the polymerization at 35 to 45° C. while in the conjoint presence of 0.2 to 0.3 part of an alkali persulfate catalyst, of 0.2 to 0.75 part of an alkali salt of an acid selected from the group consisting of hydrochloric, sulfuric, phosphoric, sulfurous and pyrophosphoric and 1.0 to 2.0 parts of a fixed alkali salt of formaldehyde condensed beta naphthalene sulfonic acid, stopping polymerization after conversion of at least 70% and stripping off uncondensed monomers.

ERVING ARUNDALE.
FRANCES BASCOM.

REFERENCES CITED

The following references are of record in the file of this patent:

UNITED STATES PATENTS

| Number | Name | Date |
|---|---|---|
| 2,373,753 | Fryling | Apr. 17, 1945 |
| 2,383,055 | Fryling | Aug. 21, 1945 |
| 2,409,915 | Vanderbilt et al. | Oct. 22, 1946 |
| 2,418,782 | Mark et al. | Apr. 8, 1947 |
| 2,424,182 | Mighton | July 15, 1947 |
| 2,537,642 | Bebb | Jan. 9, 1951 |